J. D. CHANTLER.
PLANTER.
APPLICATION FILED NOV. 7, 1917.

1,296,267.

Patented Mar. 4, 1919.

James D. Chantler INVENTOR.
BY Robert B. Killgore
ATTORNEY

UNITED STATES PATENT OFFICE.

JAMES D. CHANTLER, OF FREEPORT, NEW YORK.

PLANTER.

1,296,267. Specification of Letters Patent. Patented Mar. 4, 1919.

Application filed November 7, 1917. Serial No. 200,740.

*To all whom it may concern:*

Be it known that I, JAMES D. CHANTLER, a citizen of the United States, residing at Freeport, Nassau county, New York, have invented certain new and useful Improvements in Planters, of which the following is a specification.

My invention relates to planters or seed droppers designed to be operated by hand and is primarily intended to drop a fixed number of grains of corn, peas, beans or like seed at a stroke into a small trench made by the planter ready to be covered by the foot of the operator.

It is my object to produce a planter which will be light in weight, capable of being operated by one hand, which will not clog either at the hopper or the outlet, in which the hopper will be relatively stationary and in which the planting may be regular at any desired depth.

Figures 3, 4:
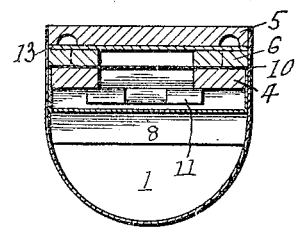
Figure 1:
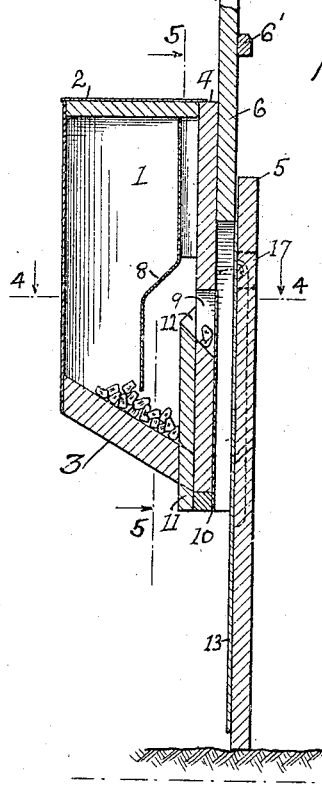
Figure 2:
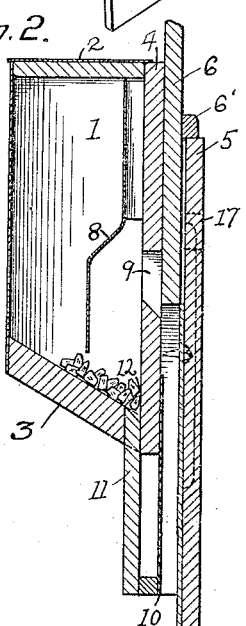
Figure 5:
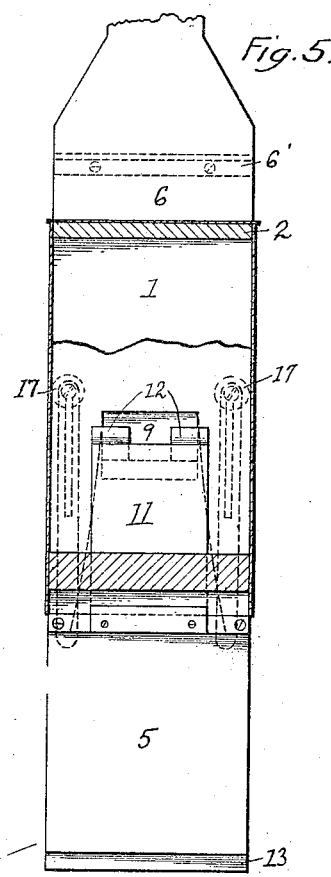

In the accompanying drawing Figure 1 is a side sectional view of my planter; with the measuring plunger in raised position to transfer the seed to the transfer pocket; Fig. 2 a like view with the measuring plunger down to receive seed from the mass; Fig. 3 a view of the shovel; Fig. 4 a sectional view of the structure of Fig. 1 on the line 4—4 and Fig. 5 a sectional view of the structure of Fig. 1 on the line 5—5.

In the operation of my planter five steps are employed; first, the mass of the seed is located in the main part of the hopper; second, a smaller mass is located in the extreme bottom of the hopper; third, sufficient seed for one hill is selected from the small mass at the bottom and raised to a transfer chamber or pocket; fourth, the selected seed is placed in the transfer pocket; and fifth, the seed is discharged from the transfer pocket to the ground.

The planter comprises a hopper 1 provided with a cover 2 and an inclined bottom 3. The back wall is double, the pieces 4 and 5 having a space between them into which the slide 6 extends and which space forms the delivery chute to the ground. A stop 6' limits the downward travel of the slide. The handle 7 is attached to the slide 6 and serves not only to carry the planter as a whole but also as the means for reciprocating the slide.

A deflector plate 8 divides the hopper into two compartments. The inner back wall 4 has an opening or transfer pocket 9 cut therein above the bottom of the hopper but within the lower compartment.

The slide 6 is cut away at its lower end leaving a guide strip on either side as shown in Fig. 4 and in dotted lines in Fig. 3 and a plate 10 secured to the slide guide strips bears against the face of the inner back wall 4 of the hopper and covers and uncovers the rear of the transfer pocket on the reciprocation of the slide.

Attached to the lower end of the slide 6 is the measuring plunger 11 which extends upward into the lower compartment of the hopper through a close fitting slot in the bottom and which plunger bears against the inner face of the hopper wall 4. This measuring plunger is pocketed at its upper end 12 and is also beveled off as shown to facilitate its passage through the seed.

A shovel 13 is secured to the outer face of the slide 6 by the slots 14—14 and screws 15—15 and may be adjusted up or down to determine the depth of planting, through the holes 17—17 in the back wall 5.

In operation the seed is thrown into the hopper and a small portion will find its way down the inclined bottom and under the deflector as shown in Fig. 1. On pushing the handle and slide down the measuring plunger will travel down with it, and, at the bottom of the stroke, will pick up enough seed for one hill. On raising the handle the plunger will travel up with the seed in its pocket until it alines with the transfer pocket in the back wall of the hopper when the seed will pass into the transfer pocket but will be held therein by the plate 10 which has traveled up with the plunger to cover the outlet. On pushing the slide down a second time the plate 10 travels down and uncovers the back of the transfer pocket and the seed falls down the shovel or space between the double walls of the back of the hopper and is delivered to the trench made by the shovel which has been pushed into the ground and given a slight movement sidewise. The seed is then covered by a slight pressure of the foot of the operator. By the mechanism and method of operation above described all the operator has to do is to push the shovel into the ground and lift the planter to put the seed into the trench ready to cover.

As the seed never lies against the opening or transfer pocket there is no danger of clogging at that point and as the measuring plunger is constantly reciprocating through the small mass of seed at the bottom of the hopper there is no danger of packing or jamming. As the outlet chute is a slot the seeds are deposited in the ground in a line and have a chance to grow without crowding and as the bottom of the outlet chute is always above the surface of the ground by reason of the protruding extension of the back wall 5 it has no chance to become clogged with dirt.

I claim:—

A planter comprising a hopper provided with an outlet above the bottom, said outlet forming a transfer pocket adapted to contain a measured amount of seed, a deflector plate within the hopper dividing it into an upper and a lower compartment, a measuring plunger reciprocating within the hopper in line with the transfer pocket adapted to deliver seed from the hopper to the transfer pocket, a slide on the outside of the hopper in line with the transfer pocket reciprocating with the measuring plunger and adapted to cover and uncover the exit side of the transfer pocket, a back wall spaced from the hopper and extending below the same and adapted to contact with the ground, a handle adapted to reciprocate between the back wall and the hopper and having a delivery chute in its lower end and carrying the measuring plunger and outside slide, and a shovel rigidly secured to the lower end of the handle.

In testimony whereof, I have signed my name to this specification in the presence of two subscribing witnesses.

JAMES D. CHANTLER.

Witnesses:
ROBT. B. KILLGORE,
MARY M. LIPP.

Copies of this patent may be obtained for five cents each, by addressing the "Commissioner of Patents, Washington, D. C."